United States Patent [19]
Ahrens et al.

[11] 3,956,638
[45] May 11, 1976

[54] BATTERY PARALLELING SYSTEM

[75] Inventors: Allan F. Ahrens, Canyon Country; Gilbert I. Cardwell, Palos Verdes Peninsula, both of Calif.

[73] Assignee: Hughes Aircraft Company, Culver City, Calif.

[22] Filed: Dec. 20, 1974

[21] Appl. No.: 534,977

[52] U.S. Cl. .................... 307/48; 320/23; 307/44; 307/53
[51] Int. Cl.² .......................... H02J 3/32
[58] Field of Search ............. 320/13, 23; 307/44, 307/48, 51, 69, 53, 54, 57

[56] References Cited
UNITED STATES PATENTS

| | | | |
|---|---|---|---|
| 3,356,855 | 12/1967 | Suzuki et al. | 307/44 X |
| 3,480,789 | 11/1969 | Binckley et al. | 307/53 |
| 3,510,672 | 5/1970 | Poppinger et al. | 307/53 |

Primary Examiner—Herman J. Hohauser
Attorney, Agent, or Firm—Allen A. Dicke, Jr.; William H. MacAllister

[57] ABSTRACT

An indefinite number of batteries is connected in parallel to provide current to share a load. Each individual battery current is compared to an average value to regulate each battery controller so that each battery supplies its share of the current.

9 Claims, 4 Drawing Figures

BATTERY PARALLELING SYSTEM

The invention herein described was made in the course of a contract with the Department of the Air Force.

BACKGROUND OF THE INVENTION

This invention is directed to a battery paralleling system for controlling the individual battery currents into the system.

In most systems where two batteries are connected in parallel, the failure mode is such that one battery takes the whole load. In prior systems the regulation of plural batteries connected in parallel to a load relies upon one battery as a standard to which the others are compared. Of course, with the failure of the reference battery, other problems ensue. Binckley U.S. Pat. No. 3,480,789 describes such a system.

Suzuki U.S. Pat. No. 3,356,855 describes a paralleling operation for power supplies, but uses a ring technique which requires the use of a pair wires between each supply. It also requires a reference battery.

SUMMARY OF THE INVENTION

In order to aid in the understanding of this invention, it can be stated in essentially summary form that it is directed to a battery paralleling system wherein the output of each battery is measured and is compared to an average value so that the battery regulator in series with each battery is individually adjusted and controlled for controlling individual battery output.

It is thus an object of this invention to provide a battery paralleling system whereby the output of each battery is individually controlled. It is another object to measure the output of each battery, compare the measured output to a reference, and to control the output of each battery in accordance with the difference, and wherein the reference is related to the outputs of all the batteries. It is another object to provide a battery conditioning control circuit in which the output of each battery is measured and is combined into an average value and is compared to the average value to individually signal differences from the average value. Other objects and advantages of this invention will become apparent from a study of the following portion of the specification, the claims, and the attached drawings.

DESCRIPTION

Figure 1:
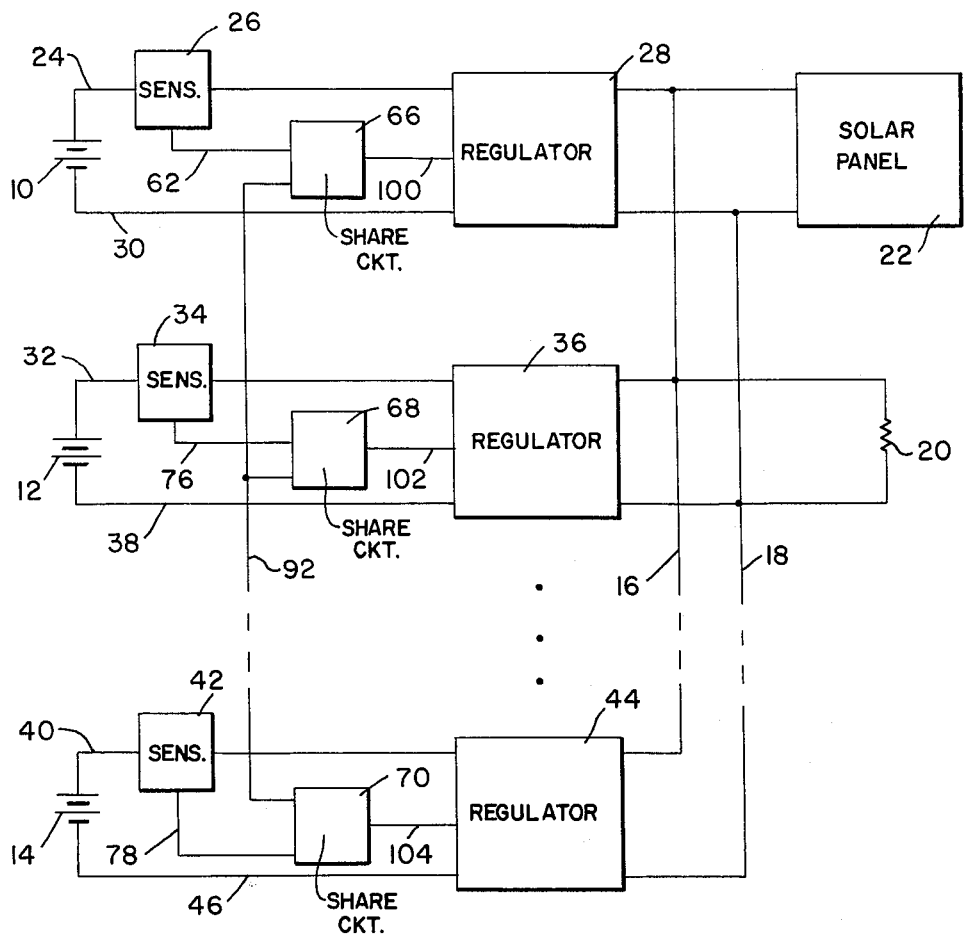
FIG. 1 is a block diagram of the battery paralleling system of this invention showing a plurality of batteries having their outputs paralleled and connected to a load.

The battery paralleling system is shown in FIG. 1 and is illustrated as being capable of satisfactorily paralleling the outputs of a plurality of batteries. The plurality may be from two up to any desired number. There is no practical limit to the number of paralleled batteries, so hundreds can be paralleled, if desired. FIG. 1 illustrates batteries 10, 12 and 14 as being connected in parallel. The paralleled battery output supplies busses 16 and 18 which supply load 20. The load may also be supplied by another current source, such as solar panel 22. In some cases, the solar panel 22 may also supply charging current to the batteries, when sufficient current from the solar panel is available. The present invention on the battery paralleling system, however, is directed solely to the problem of regulating the output of each of the batteries 10, 12 and 14, and any others in the paralleling circuitry, to substantially equalize the current flowing from each battery to the load. Solar panel 22 is illustrated to show how other current sources may vary the requirement of current supplied from the batteries to the load.

As seen in FIG. 1, battery line 24 connects the output of battery 10 through current sensor 26 and switching regulator 28 to buss 16. Battery line 30 connects the other side of battery 10 through switching regulator 28 to buss 18.

Similarly, battery line 32 connects one side of battery 12 through current sensor 34 and swtiching regulator 36 to buss 16, while battery line 38 connects the other side of battery 12 through switching regulator 36 to buss 18. Each of the batteries is connected in that way to the busses, and the last battery 14 has one side connected by battery line 40 through current sensor 42 and switching regulator 44 to buss 16, while its other side is connected through battery line 46 through switching regulator 44 to buss 18. In this way, all of the batteries are connected to the busses. Control of the regulators 28, 36 and 44 control the sharing of the supplying of current from the batteries to the load.

Figure 2:
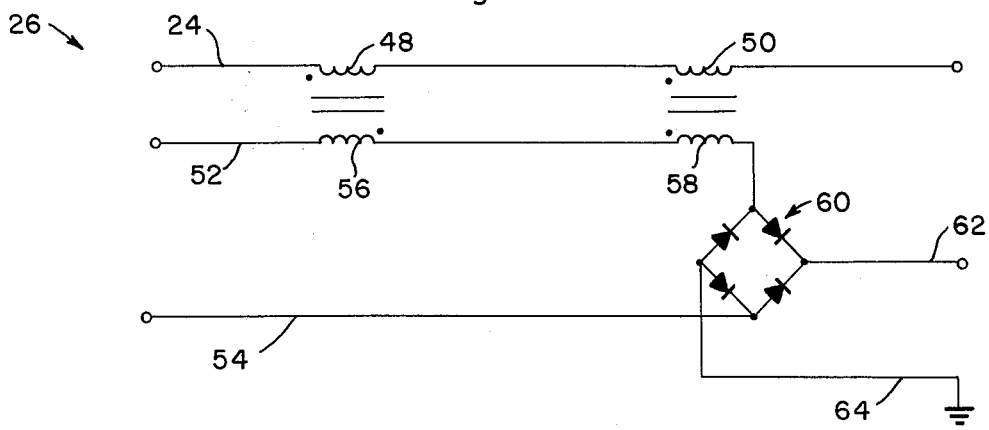
FIG. 2 is a circuit diagram of the individual battery output current measuring device.

FIG. 2 illustrates current sensor 26. The current sensors 34 and 42 are identical. Battery current passes from battery line 24 through serially connected saturable reactor coils 48 and 50 and thence through switching regulator 28 to the load. Excitation current is supplied to lines 52 and 54 from an AC source, such as 16K Hz. Excitation line 52 is connected through serially connected saturable reactor coils 56 and 58 which are respectively paired with coils 48 and 50, with one pair arranged with the same polarity in the other pair with opposite polarity. The output of reactor coils 56 and 58 is rectified by full wave rectifier 60. The rectifier has an output in line 62 with its other side connected to ground 64. The saturation conditions are such that rectifier 60 acts as a current source which supplies current to line 62 which is proportional to the battery current in line 24.

Figure 3:
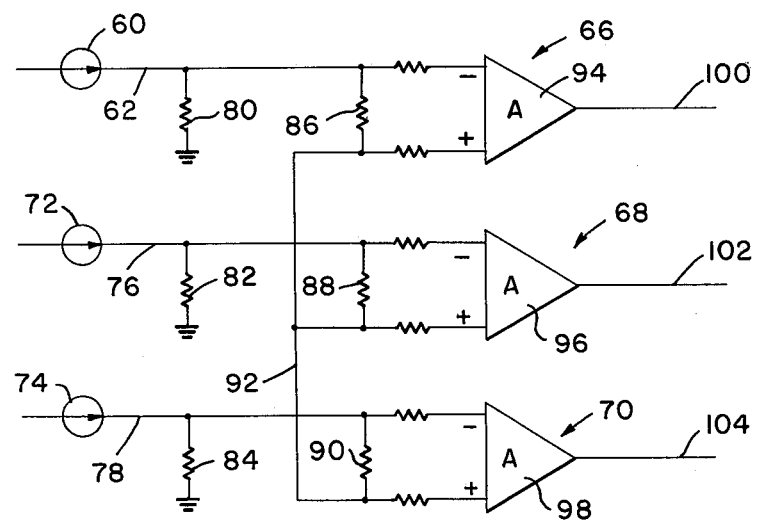
FIG. 3 is a schematic diagram showing the inter connection of the sharing cirucit.

Sharing circuit 66 cooperates with sharing circuits 68 and 70 to average the current flow to buss 16 from batteries 10, 12 and 14, as represented by current sources 60, 72 and 74, see FIG. 3. Lines 62, 76 and 78 are respectively connected to ground through resistors 80, 82 and 84 so that the voltage in each of the lines 62, 76 and 78 with respect to ground is proportional to the current. Sharing resistors 86, 88 and 90 are connected on one side to sharing line 92 and are respectively connected on their other sides to the current source lines 62, 76 and 78. With this arrangement, when one of the current sources is at a higher current, its voltage is higher and current flows through the sharing resistor to the sharing line and this current flows the other way out through the sharing resistor connected to a source having lower current. The voltage drop across the sharing resistor from a higher current source is in one direction (i.e., positive), while the voltage drop through the sharing resistor connected to the lower current source is opposite (i.e., negative).

As seen in FIG. 3, the voltage signals from the sharing resistors are connected to the inputs of operational amplifiers 94, 96 and 98 respectively. The outputs of these amplifiers are respectively into control lines 100, 102 and 104. The sharing signals in these lines control the regulators 28, 36 and 44 to regulate battery current to the load.

Figure 4:
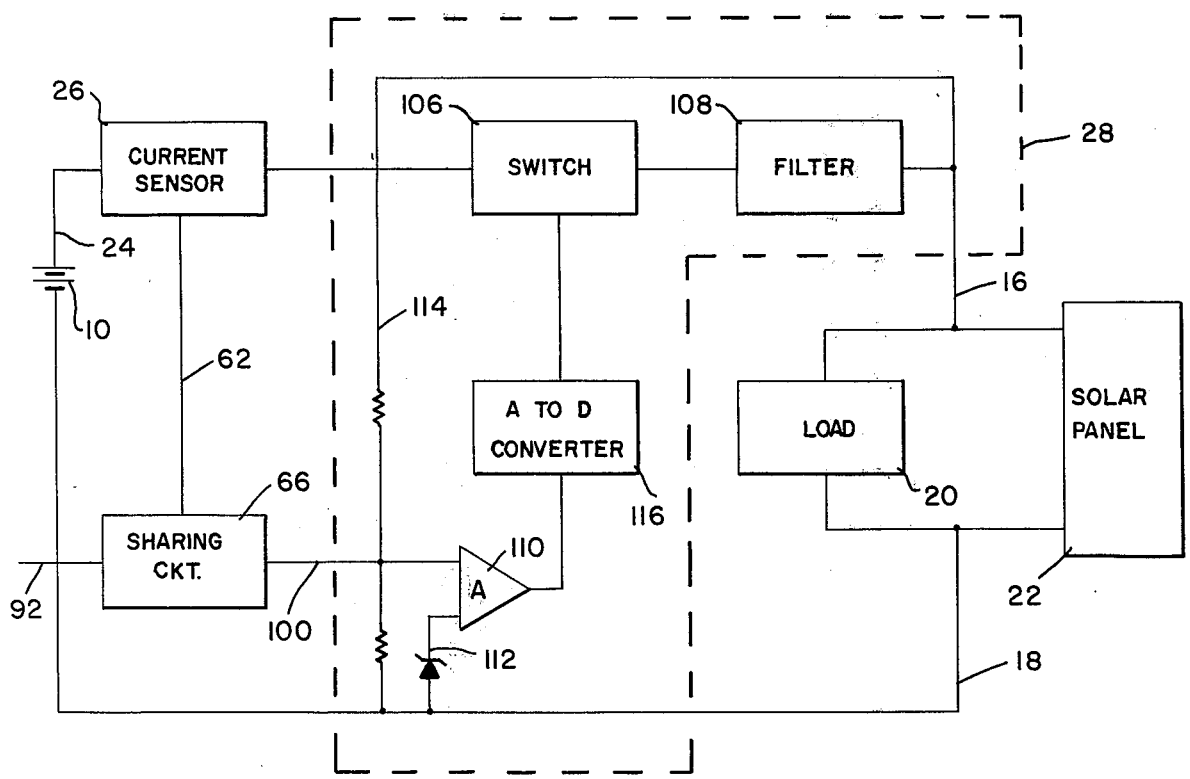
FIG. 4 is a block diagram of the battery current regulator shown connected into the circuit.

As is seen in more detail in FIG. 4, switching regulator 28 has switch 106 and filter 108 in battery line 24. The ratio of on-time to off-time of switch 106 regulates the current flow. Filter 108 smoothes the current to minimize voltage pulsing. Operational amplifier 110 has several signals fed thereto. Reference voltage supply 112 in the form of a zener voltage, is fed to one input. An output voltage reference is connected through line 114 and through suitable scaling resistors to control line 100, and control line 100 in turn is connected to another input of operational amplifier 110. The output of operational amplifier 110 is fed to analog-to-digital converter 116 which in turn is connected to control the cycling of switch 106. While a switching regulator is indicated, other kinds of regulators can be substituted therefore as being operated by the sensor and sharing circuitry of this invention.

It is thus seen that, when any battery is supplying more than average current, its sharing resistor shows a value which drives its corresponding sharing amplifier in a direction to reduce the duty of that regulator to reduce battery current in that particular line. Conversely, when any other battery is supplying less than average current its regulator increases battery current in that line.

From this disclosure of the system, it can be seen that the battery discharge curent of each battery is measured and is compared to the average battery discharge current of all the paralleled batteries. The voltage in sharing line 92 is approximately the average of the voltages at the outputs of the current sources. An error voltage is developed for each battery and is used to control each switching regulator so that each battery current is controlled toward the average discharge current of all the batteries. Thus, each battery is individually regulated so that each supplies the same current independent of battery voltage.

This invention having been described in its preferred embodiment, it is clear that it is susceptible to numerous modifications and embodiments within the ability of those skilled in the art and without the exercise of the invention faculty. Accordingly, the scope of this invention is defined by the scope of the following claims.

What is claimed is:

1. A battery paralleling system for connecting a plurality of batteries in parallel and for regulating the current from each battery comprising:
   a plurality of battery lines each for connection to a battery and for receiving battery current, said battery lines being connectable to a buss for supplying a load connected to the buss;
   a battery current regulator serially connected in each battery line for limiting the battery current in each battery line;
   a current sensor connected in each battery line for sensing the battery current in each battery line; and
   a sharing circuit connected to each current sensor and to each current regulator for controlling each regulator so that the current in each battery line is substantially equal to the current in each of the other battery lines.

2. The battery paralleling system of claim 1 wherein each battery current sensor has an output signal line which carries an output signal corresponding to battery current in that battery line, each output signal line being connected to a sharing line through its own sharing resistor so that the voltage drop and polarity across each sharing resistor is related to the relationship of each output signal to the substantially average signal in said sharing line.

3. The battery paralleling system of claim 2 wherein each sharing resistor is connected to its corresponding current regulator so that the voltage thereacross controls the corresponding current regulator.

4. The battery paralleling system of claim 3 wherein each sharing resistor is connected to control its corresponding current regulator in such a way that, when current flow is through a sharing resistor from the signal line to the sharing line, the corresponding battery current regulator reduces the amount of battery current and, when the current flow through a sharing resistor is from said sharing line to said signal line, said corresponding regulator is controlled to increase battery current.

5. The battery paralleling system of claim 4 wherein an operational amplifier is connected across each sharing resistor and the output of each operational amplifier is connected to control the corresponding regulator.

6. The battery paralleling system of claim 1 wherein each battery line current sensor has an output signal line carrying an output current signal which corresponds to the current in the corresponding battery line and said sharing circuit comprises a resistor connected to each sharing line so that the voltage of each sharing line is related to the signal current, a floating sharing line, a sharing resistor connected between each signal line and said sharing line so that current flow between said signal lines and said sharing line through said sharing resistors causes said sharing line to float at a voltage related to average battery current, and a control line carrying a control signal representing polarity and potential drop from each sharing resistor to the corresponding regulator so that the current in each battery line is controlled toward average current.

7. The battery paralleling system of claim 6 wherein an operational amplifier is connected between each signal line and said sharing line, said operational amplifier being connected to said control line to produce the control signal in said control line.

8. The battery paralleling system of claim 7 wherein there are at least three battery lines and there is a battery connected to each of said battery lines.

9. The battery paralleling system of claim 7 wherein there is an output buss and each of said regulators is connected to supply battery current to said output buss, and there is a load connected to said output buss.

* * * * *